E. HARROLD.
SAW GUARD.
APPLICATION FILED FEB. 18, 1916.
1,311,508.
Patented July 29, 1919.
3 SHEETS—SHEET 1.
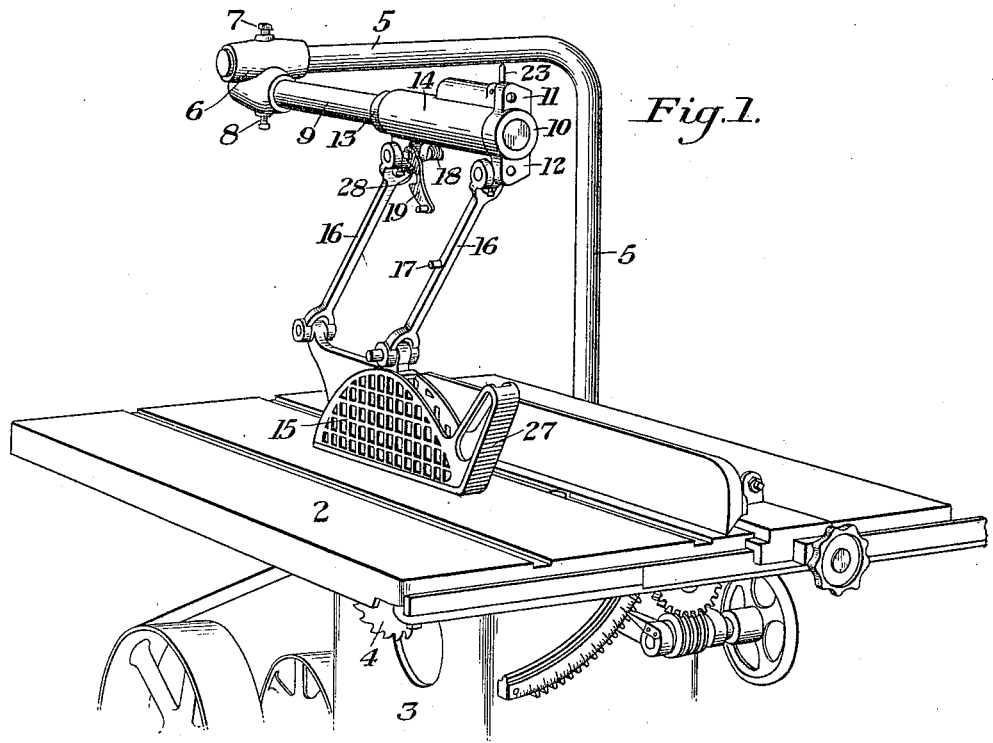
Fig. 1.
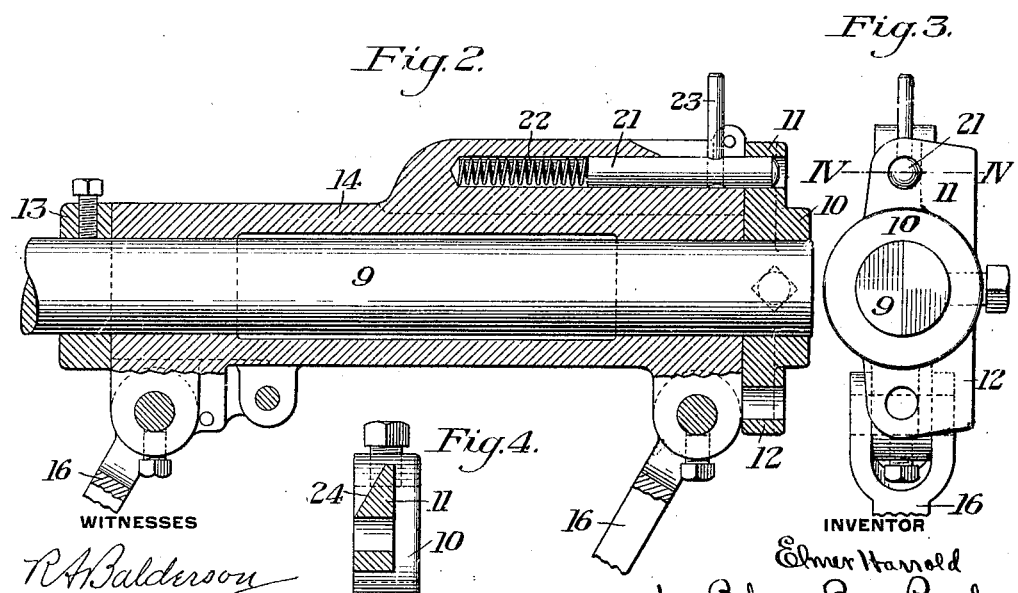
Fig. 2.
Fig. 3.
Fig. 4.
WITNESSES
R. A. Balderson
Jesse B. Heller
INVENTOR
Elmer Harrold
by Bakewell, Byrnes, Parmelee
Attys.

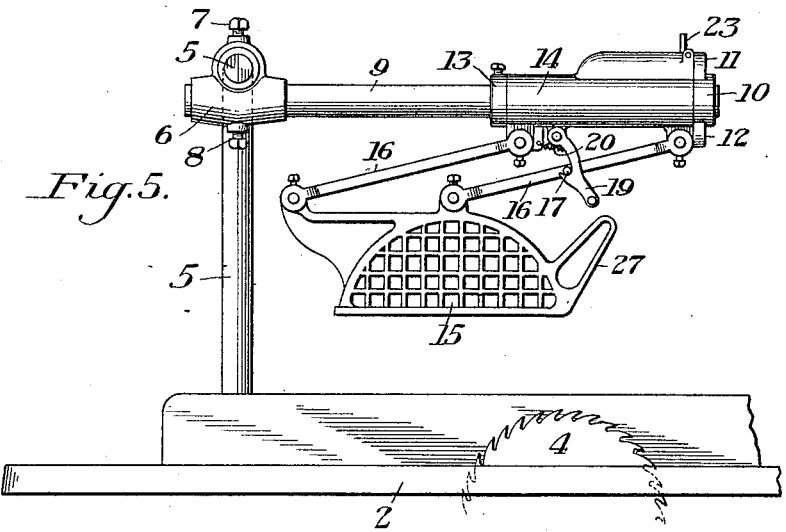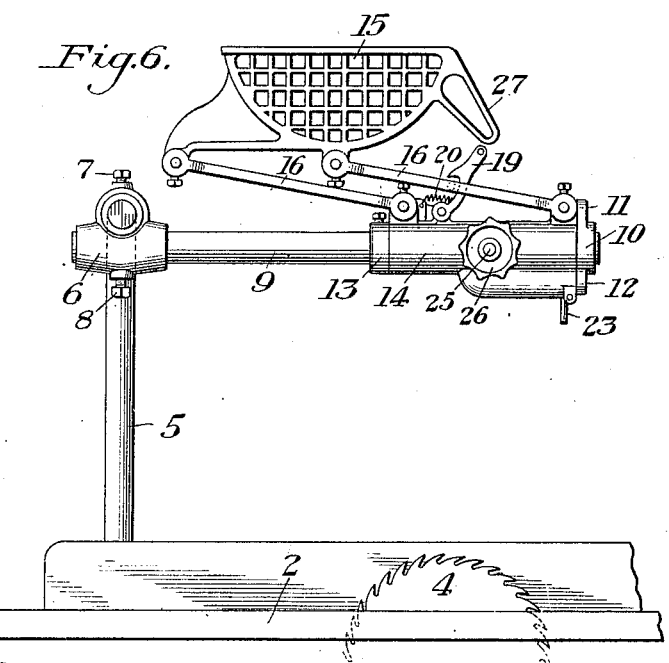

E. HARROLD.
SAW GUARD.
APPLICATION FILED FEB. 18, 1916.
1,311,508.
Patented July 29, 1919.
3 SHEETS—SHEET 3.
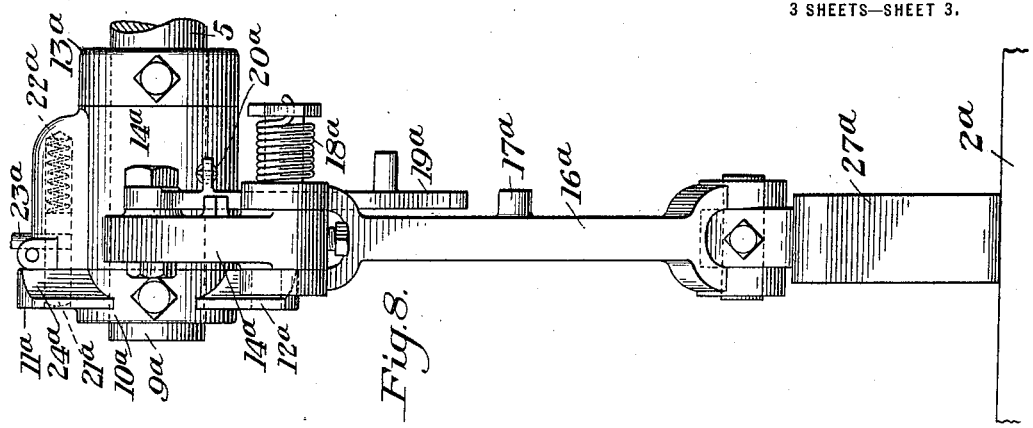
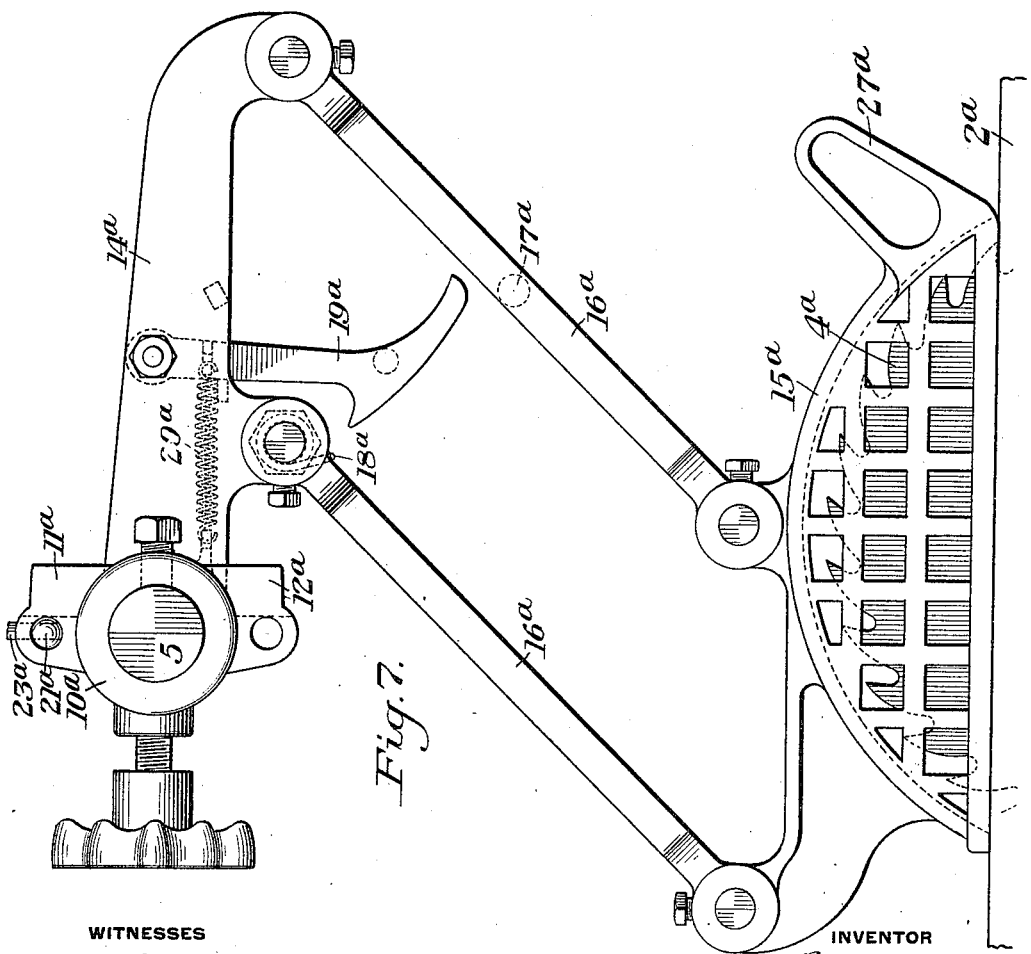

UNITED STATES PATENT OFFICE.

ELMER HARROLD, OF LEETONIA, OHIO, ASSIGNOR TO THE CRESCENT MACHINE COMPANY, OF LEETONIA, OHIO, A CORPORATION OF OHIO.

SAW-GUARD.

1,311,508. Specification of Letters Patent. Patented July 29, 1919.

Application filed February 18, 1916. Serial No. 79,063.

*To all whom it may concern:*

Be it known that I, ELMER HARROLD, a citizen of the United States, and a resident of Leetonia, in the county of Columbiana and State of Ohio, have invented a new and useful Improvement in Saw-Guards, of which the following is a full, clear, and exact description, reference being had to the accompanying drawings, forming part of this specification, in which—

Figure 1 is a perspective view of a portion of a frame for a circular saw, and one form of my improved guard connected thereto.

Fig. 2 is a detail longitudinal section through the rotatable hanger for the saw guard, showing the details of the locking bolt.

Fig. 3 is an end view of the structure shown in Fig. 2.

Fig. 4 is a detail sectional view of the locking bracket for locking the rotatable hanger.

Fig. 5 is a side elevation of a portion of the saw table and a guard, showing the guard swung upwardly and latched in one of its inoperative positions.

Fig. 6 is a similar view showing the guard and supporting mechanism swung 180° about the axis of the supporting bar therefor, to remove the parts out of position with relation to the saw in order to provide sufficient room between the supporting bar and the table for any desired special purpose.

Fig. 7 is a side elevation of a modified form of hanger mechanism for the guard; and Fig. 8 is an end view thereof.

This invention relates to an improvement in guards for circular saws, and is designed to provide a cheap and efficient device which will readily be moved by the lumber to be cut as it is moved toward the saw, and which guard will be held in contact with the lumber by gravity, to cover that portion of the saw above the lumber while it is being cut.

The object of my invention is to provide parallel bars for supporting the guards which are so arranged that the guard will be moved rearwardly and upwardly by the lumber when advanced toward the saw, and maintain the bottom of the guard parallel with the saw table; the parallel bars being pivotally connected to the guard and a hanger above the guard which is in the same vertical plane as the saw, so that there will be no tendency to shift the guard laterally with relation to the saw. Another object of my invention is to provide means of a novel character for automatically locking the guard in an elevated position above the saw when moved to a predetermined position; and also to provide means to permit the guard and its supports to be readily moved out of operative position with relation to the saw, to provide sufficient room between the saw and the guard supporting mechanism for any desired special purpose.

The precise nature of my invention will be best understood by reference to the accompanying drawings, which will now be described, it being premised, however, that various changes may be made in the details of construction, and the general arrangement of the parts, without departing from the spirit and scope of my invention as defined in the appended claims.

Referring to the form shown in Figs. 1 to 6 of the drawings, the reference character 2 designates a saw table which is supported on a frame 3, and 4 designates a circular saw which is connected to a shaft mounted on the frame 3. 5 is a supporting arm which is adjustably mounted in the frame 3 in any desired manner, and is provided with a vertical portion and a horizontal portion, which extends laterally over the table 2. Adjustably connected to the horizontal portion of the supporting arm 5 is a supporting hanger 6, which is provided with two sockets, one of which surrounds the horizontal portion of the supporting arm 5, and is adjustably connected thereto by means of a set screw 7, and 8 is a set screw extending through the walls of the other socket and is arranged to secure a supporting bar 9 in position therein. This supporting bar 9 extends in a horizontal direction and at right angles to the horizontal portion of the supporting arm 5, and in the vertical plane occupied by the saw 4.

Connected to the end of the bar 9 is a bracket 10 having arms 11 and 12 for the purpose hereinafter described; and rotatably mounted on the bar 9 between the bracket 10 and a collar 13 secured to the bar 9 is a rotatable hanger 14. 15 is a saw guard which is of shell form and normally rests on the table 2 over the saw, as shown in Fig. 1. Pivotally connected to lugs on the saw guard and the rotatable hanger 14 are parallel bars 16, and 17 is a catch on one of the parallel bars, which is arranged to be engaged by a swinging latch 19 pivotally connected to a lug on the rotatable hanger 14. 18 designates a spring coiled about one of the pivotal connections of one of the parallel bars 16 which is arranged to partially counterbalance the weight of the guard and its supporting devices. This latch is normally held downward by means of a spring 20, and is provided with a cam surface below the hook portion thereof which is engaged by the catch 17 when it is elevated, to move the latch upwardly so that the catch will clear the latch, and as soon as the catch clears the latch, the latch will be moved downward by the spring 20 to lock the guard in its elevated position, as shown in Fig. 5.

Slidably mounted in a recess in the rotatable hanger 14 is a bolt 21 which is normally held in its forward position by means of spring 22, and 23 is a handle connected to the bolt 21 for moving the bolt rearwardly, and which handle is slidably mounted in a slot through the wall of the rotatable hanger. The arms 11 and 12 are provided with openings for the reception of the bolt 21 to retain the parts shown in Figs. 1, 2 and 5 when the bolt is in the opening in the arm 11, and to retain them in the position shown in Fig. 6 when the bolt is in the opening in the arm 12. These arms 11 and 12 are provided with cam surfaces such as shown at 24 in Fig. 4, which are arranged to move the bolt rearwardly against the action of the spring 22 when the device is swung from one position to another about the bar 9.

25 is a set screw passing through the wall of the rotatable hanger 14, and is provided with a hand wheel 26, and which set screw is adapted to firmly secure the hanger 14 in its operative position to prevent vibration of the parts.

The guard when in use is normally in the position shown in Fig. 1, and the lumber to be cut is advanced over the table and engages a cam 27 on the front of the guard which will move the guard rearwardly and upwardly in a plane parallel with the table, and as soon as the guard is moved upwardly a distance sufficient to clear the lumber to be cut, the lumber will pass under the guard and over the saw, the guard being held in contact with the lumber by gravity; and as soon as the lumber has passed beyond the guard, the guard will be returned to the position shown in Fig. 1. When it is desired to elevate the guard, it is merely pushed back to permit the latch 19 to engage the catch 17, which will retain the parts in the position shown in Fig. 5. If it is desired to provide a greater amount of room between the supporting bar 9 and the table, the set screw 25 is slacked, and the bolt 21 is moved rearwardly by the handle 23; the parts, together with the hanger 14, are then rotated about the bar 9, and as soon as the parts are shifted to the position shown in Fig. 6, the bolt 21 will be moved forward by the spring 22 and shoot the bolt into the opening in the arm 12 to retain the parts in this position.

In Figs. 7 and 8 I have shown a modified form, and in which I have given the same parts the same reference character with the letter "a" affixed. In this form the rotatable hanger 14ª is mounted directly on the horizontal portion of the supporting arm 5, and mounted on this arm 5 is a locking bracket 10ª which is also provided with arms 11ª and 12ª having openings for the reception of the bolt 21ª. In this construction the mechanism is swung about the horizontal portion of the supporting arm 5, so that the parts will swing at right angles to the movement of the parts in the other figures.

The advantages of my invention result from the provision of supporting means for a saw guard which are so arranged that the guard will be moved rearwardly and upwardly and maintained parallel to the saw table; further from the provision of means for automatically locking the guard in an elevated position when it is moved to a predetermined point; and also from the provision of means for permitting the guard, together with all of its supporting mechanism, to be rotated about the supporting arm therefor so that all of the parts are removed from below the supporting arm, to provide sufficient room above the saw for any desired special purpose, and which mechanism is so arranged that the guard can be moved out of position without disconnecting any of the supporting mechanism.

I claim:

1. A device of the character described, comprising a horizontal supporting member, a support therefor, a hanger journaled on the horizontal supporting member, a saw-guard pivotally supported on the hanger, means for adjusting the hanger with relation to the support to adjust the position of the guard, means at each end of the hanger for preventing endwise movement thereof on the horizontal supporting member but which will permit rotation thereof, and a lock coacting with the hanger and one of said means for locking the hanger against rotation, said lock being arranged to lock the hanger in two positions, substantially as described.

2. A device of the character described, comprising a horizontal supporting member, a support therefor, a hanger journaled on the horizontal supporting member, a saw-guard pivotally supported on the hanger, means for adjusting the hanger with relation to the support to adjust the position of the guard, a collar at each end of the hanger connected to the horizontal supporting member for preventing endwise movement of the hanger, and a spring bolt mounted in the hanger, there being two holes in one of the collars adapted to be engaged by the bolt to lock the hanger in two positions and prevent rotation thereof when the bolt engages one of said openings, substantially as described.

3. A saw-guard support, comprising a hanger having an opening therethrough for the reception of a support about which the hanger is adapted to rotate, means for preventing endwise movement of the hanger on the support, parallel bars pivotally connected to the hanger and the saw-guard, said parallel bars being arranged to permit the guard to be moved away from the saw when the saw is to be used while the hanger is arranged to permit the guard to be swung out of operative position, and a spring lock mounted on the hanger arranged to lock it in its operative and inoperative positions, substantially as described.

4. A saw-guard support, comprising a hanger having an opening therethrough for the reception of a support about which it is adapted to rotate, means for mounting the hanger on said support to prevent endwise movement thereof, a pair of parallel bars pivotally connected to the hanger and the saw-guard and arranged to permit the guard to be moved way from the saw by the workpiece, and a latch adapted to engage one of the parallel bars to lock the guard in an inoperative position, substantially as described.

5. A device of the character described, comprising a horizontal supporting member extending over the saw table, a support therefor, a supporting hanger adjustably mounted on said horizontal supporting member, a second horizontal supporting member adjustably mounted in said hanger and extending at right angles to the first horizontal supporting member, a rotatable hanger journaled on the second horizontal supporting member, means for preventing endwise movement of the hanger on the second horizontal supporting member, a lock co-acting with the hanger and one of said means for locking the hanger against rotation in two positions, and a saw-guard pivotally hung from said hanger, substantially as described.

In testimony whereof, I have hereunto set my hand.

ELMER HARROLD.

Witnesses:
L. A. GUEHL,
H. M. CORWIN.

Copies of this patent may be obtained for five cents each, by addressing the "Commissioner of Patents, Washington, D. C."